(12) United States Patent
Magno, Jr. et al.

(10) Patent No.: US 7,644,957 B2
(45) Date of Patent: Jan. 12, 2010

(54) EXPANSION-DEFLECTING COUPLING

(75) Inventors: Joey D. Magno, Jr., Cordova, TN (US); Ken Gibbon, Longview, TX (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/300,627

(22) Filed: Dec. 14, 2005
(Under 37 CFR 1.47)

(65) Prior Publication Data
US 2006/0186663 A1    Aug. 24, 2006

Related U.S. Application Data

(60) Provisional application No. 60/636,766, filed on Dec. 15, 2004.

(51) Int. Cl.
*F16L 21/00* (2006.01)
*H02G 15/26* (2006.01)

(52) U.S. Cl. ................. 285/236; 285/223; 285/235; 174/21 R

(58) Field of Classification Search ............ 285/223, 285/235, 236, 237; 174/21 R, 21 JS, 21 CA, 174/78, 86; 403/297
See application file for complete search history.

(56) References Cited

U.S. PATENT DOCUMENTS

| | | | | |
|---|---|---|---|---|
| 1,347,834 A | * | 7/1920 | Barber | 285/334.3 |
| 2,885,461 A | * | 5/1959 | Cafiero | 174/84 S |
| 3,669,470 A | * | 6/1972 | Deurloo | 285/45 |
| 3,783,431 A | | 1/1974 | Badey et al. | |
| 4,109,097 A | | 8/1978 | Berry | |
| 5,215,338 A | * | 6/1993 | Kimura et al. | 285/154.2 |
| 5,288,110 A | * | 2/1994 | Allread | 285/146.1 |
| 5,506,376 A | * | 4/1996 | Godel | 181/208 |
| 5,778,939 A | * | 7/1998 | Hok-Yin | 138/120 |
| 5,992,896 A | * | 11/1999 | Davey et al. | 285/49 |
| 6,015,170 A | | 1/2000 | Carpenter | |
| 6,734,360 B2 | | 5/2004 | Magno | |

OTHER PUBLICATIONS

Cooper Crouse-Hinds, XD Expansion/Deflection Coupling, Catalog p. 174, © 2002 Cooper Industries, Inc.
EGS Appleton, Reflection and Expansion Coupling for Rigid Metal Conduit and IMC, p. 3, © 2001.
O-Z/Gedney, Expansion & Pull Box Fittings, CA4.
US 6,486,404, 11/2002, Magno (withdrawn)

* cited by examiner

*Primary Examiner*—James M Hewitt
*Assistant Examiner*—Jay R Ripley
(74) *Attorney, Agent, or Firm*—Hoffmann & Baron, LLP

(57) ABSTRACT

The present invention provides an expansion-deflection coupling which allows for higher angular deflection, as well as greater axial expansion and compression with increased parallel offset movements. The coupling includes a pair of identical hubs adapted to accommodate conduits within, and a flexible hollow cylinder extending between the hubs. At least one mid-coupling is located within the cylinder, and at least two plastic funneled tubes, each of which extends securely within the cylinder between the mid-coupling and one of the hubs. One of the hubs is secured to a union coupling.

20 Claims, 4 Drawing Sheets

EXPANSION-DEFLECTING COUPLING

CROSS-REFERENCE TO RELATED APPLICATION:

This application claims the benefit of U.S. Provisional Application No. 60/636,766 filed on Dec. 15, 2004 entitled "EXPANSION-DEFLECTION COUPLING".

FIELD OF THE INVENTION

The present invention relates generally to a coupling used to couple electrical conduits. More particularly, the present invention relates to an expansion-deflection joint coupling which is flexible in axial expansion and compression and angular deflection while providing protection to the electrical wires it contains.

BACKGROUND OF THE INVENTION

Electrical conduit is typically used to support runs of electrical wires or cables. These conduits in certain instances are required to be grounded and which may be subject to movement relative to each other. Such relative movement requires the use of expansion-deflection type couplings to prevent damage to the conduit or the cables inside. Conduits supporting such electrical wires or cables may be interconnected by electrical fitting joints. Certain of these joints provide for thermal expansion, permitting relative movement between the conduits in response to ambient temperature fluctuations. These joints must not only provide for relative movement between the conduits, but also must maintain ground continuity across the conduits during such movement. Expansion-deflection type couplings are also necessary to provide the flexibility to accommodate such movement. Thus, expansion-deflection type couplings will allow for expansion, contraction and deflection caused by the relative movements as discussed above.

Examples of such expansion-deflection type couplings are shown in U.S. Pat. Nos. 2,885,461; 3,783,431 and 4,109,097.

U.S. Pat. No. 2,885,461 shows an expansion and deflection conduit coupling made of two end sleeves yieldingly connected in spaced apart end to end relation by a surrounding flexible elastic sleeve or tube made of plastic. Such a coupling will allow for expansion, contraction and deflection of the conduit without damaging the conduit and providing the necessary electric continuity.

U.S. Pat. No. 3,783,431 shows an electric connector with a tubular contact member having two universal joints mounting on the contact members to permit angular movement of the contact members relative to each other. A longitudinal movement of the contact member is caused by sliding a rod contact within the tubular contact. Furthermore, a tubular sheath of flexible material encircles a portion of the rod contact outside the tubular contact to weaken any ice forming thereabout to maintain the free movement inside the connector.

U.S. Pat. No. 4,109,097 shows an expansion-deflection coupling comprised of two independent hubs adapted to be threaded on the ends of opposed spaced apart conduits, a flexible grounding strap is connected completely within and between the hubs and a flexible watertight jacket is secured to the outer surface of the hub. Such a coupling allows for linear misalignment of the hubs up to ¾ of a inch and/or angular displacement of the hubs relative to each other up to 30° and also allows for expansion or contraction of the coupling up to ¾ of an inch.

The expansion-deflection couplings as discussed above in the prior art use an internal plastic sleeve to maintain constant inner diameter in any position and provide a smooth wire way for protection of wire insulation. Such couplings have very limited flexibility in expansion or contraction, in angular deflection and further in line or misalignment.

It is desirable therefore to provide an expansion-deflection coupling which will have more flexibility in axial expansion, and compression and angular deflection while providing protection to the wires or cables it contains.

SUMMARY OF THE INVENTION

The present invention discloses an expansion-deflection coupling having a pair of identical hub fittings positioned at opposing ends. The coupling also includes a flexible hollow cylinder extending between said hubs defining a space within. Also included is at least one mid-coupling located within the cylinder, and at least two funneled tubes extending within the cylinder, wherein each of the funneled tubes include opposed flared ends and one of the opposed end is movably secured to the mid-coupling and the other opposed end is movably secured to one of the hubs.

DETAILED DESCRIPTION OF THE PREFERRED EMBODIMENT

The expansion-deflection coupling according to the present invention may be used with rigid metal conduit and IMC, to couple together two sections of conduit subject to movement relative to each other. The expansion joints are installed without the need for unit disassembly. The expansion joints are internally grounded and, therefore, do not require an external bonding jumper when used indoor or outdoor. The expansion joints of the present invention may be used with long conduit runs to permit linear movement caused by thermal expansion and contraction. Also, for long conduit runs the expansion joints prevent conduits from buckling and possible resulting circuit failures. The expansion joints of the present invention meet the requirements of the National Electrical Code, providing an electrically continuous raceway with no additional bonding means required.

Furthermore, the coupling of the present invention provides greater flexibility in axial expansion and compression, angular deflection and parallel offset movements without collapsing or fracturing, and damaging the electrical wires it contains, as will be described in greater detail below. The coupling of the present invention can be manufactured at reasonable cost in a variety of sizes adapted to be compatible with standard conduits of differing diameters. The coupling will be smaller and lighter in design and can be assembled in virtually any lengths. Additionally, the coupling can be readily installed and will be durable and long lasting, suitable for use in various environments.

Figure 1A:
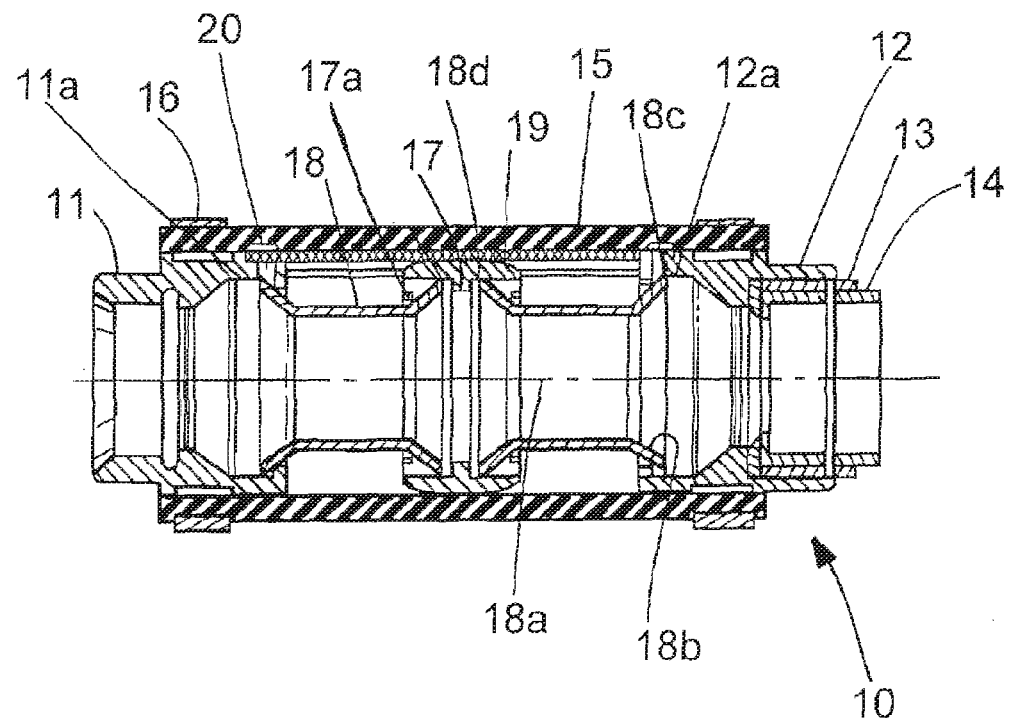
FIG. 1A is a longitudinal sectional view of a coupling according to one embodiment of the present invention.
Figure 1B:
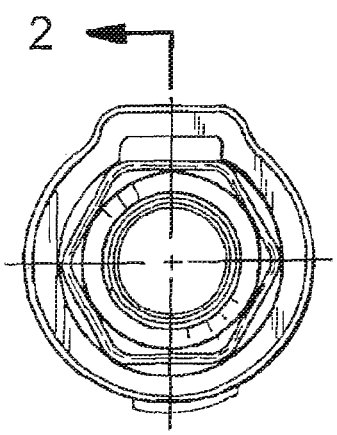
FIG. 1B is a cross sectional view along the line 2-2 of FIG. 1A.

Referring now to FIGS. 1A and 1B as shown in FIG. 1, there is shown an expansion-deflection coupling (hereinafter "coupling") 10 of the present invention. The coupling 10 includes a pair of hubs 11 and 12 which are identical to each other. The hub 11 is positioned at one end of the coupling 10 while hub 12 is positioned at the opposing end. The hub 12 preferably has an internal diameter compatible with an external diameter of a union coupling 13, preferably an expansion coupling, to accommodate a conduit (not shown) to which it is secured. The hub 12 is secured to the union coupling 13 via a union nut 14 as shown.

A flexible extruded hollow cylinder 15 preferably made of rubber extends from hub 11 to hub 12. The cylinder 15 defines an internal chamber between the hubs 11 and 12. The cylinder 15 is preferably clamped to the ends of the outer surface of each of the hubs 11 and 12 by means of conventional clamps 16. The compressive force exerted by the clamps 16 will provide a waterproof connection between the cylinder 15 and the hubs 11 and 12. The clamps 16 are preferably made of stainless steel material.

In the preferred embodiment, the coupling 10 further includes at least one circular mid-coupling 17 preferably made of cast iron, "floating" inside the cylinder 15. At least two funneled tubes 18, are assembled inside the hollow cylinder 15 as shown in FIG. 1A. The tubes 18 are preferably made of steel, however, they can be made of plastic. Each of the funneled tubes 18 include a central cylindrical tubular configuration 18a having a central interior bore 18b defining a hollow cylindrical aperture for receipt therein of the electrical wires, cables or the like. The funneled tube 18 also include opposed flared ends, or conical shaped ends 18c and 18d defining a substantially circular opening. The funneled tubes 18 will prevent wires getting caught up by creating more space for the wires to run through. The funneled tubes 18 will also reduce friction during wire pull through to provide greater wire protection and easier wire pulling.

The hubs 11 and 12 and the mid-coupling 17 cover each end 18c and 18d of the funneled tubes 18 as shown in FIG. 1A. One end 18c of tube 18 is preferably snapped to the hubs 11 and 12, while the other end 18d is snapped to the mid-coupling 17. Specifically, each of the hubs 11 and 12 include inwardly projecting lips 11a and 12a respectively, to effectively hold the funneled tubes 18 by snapping into place onto the end 18c of the funneled tube 18. Similarly, interior mid-coupling 17 also includes projecting lips 17a to effectively hold the funneled tubes 18 by snapping into place onto the end 18d of the funneled tube 18. Thus, funneled tube 18 operates much like a "ball" to the corresponding "socket" in mid-coupling 17 or hub 11 or 12.

A flexible braid 19 is secured by braid screws 20 on top of each of the hubs 11 and 12. As shown in FIG. 1A, the braid 19 extends longitudinally from one end of the hub 11 to the other end of the hub 12. Since the braid 19 and the screws 20 are positioned within the cylinder 15, the braid and the screws are completely protected from any damage which might occur from wrenching, corrosion, or otherwise.

Figure 2A:
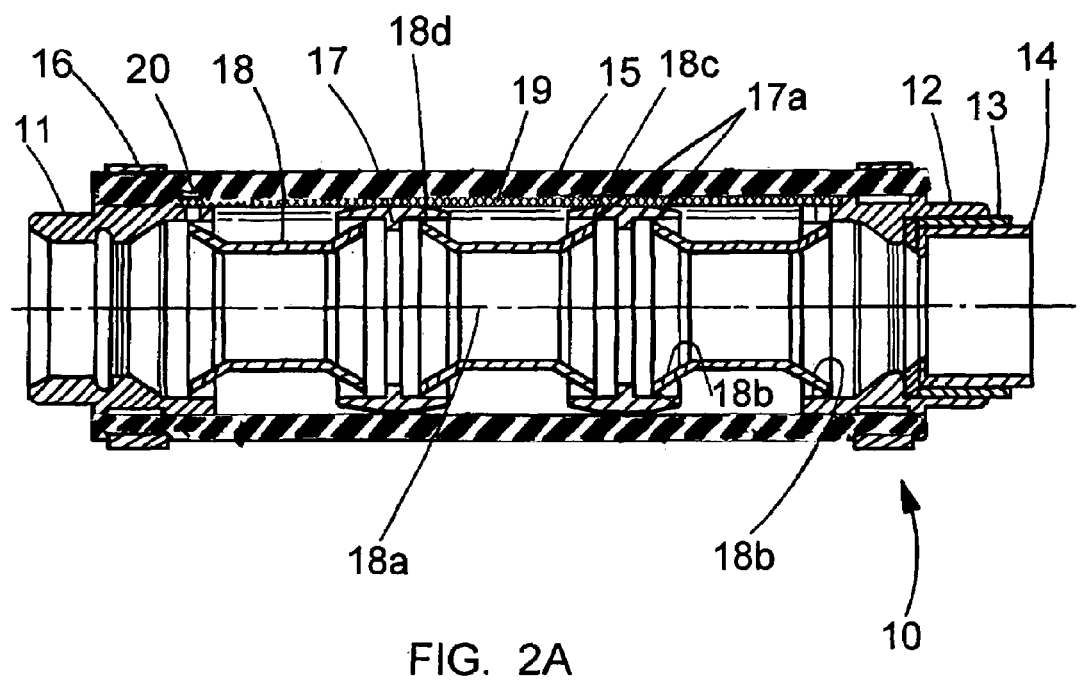
FIG. 2A is a longitudinal sectional view of the coupling according to an alternate embodiment of the present invention.
Figure 2B:
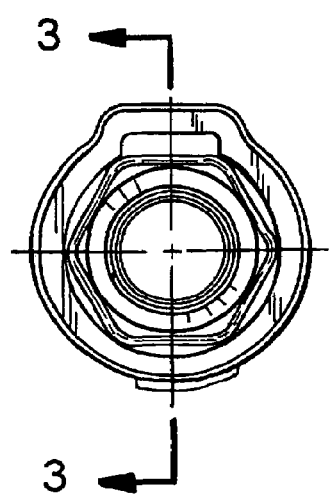
FIG. 2B is a cross sectional view along the line 3-3 of FIG. 2A.

The length of the coupling 10 may preferably be varied as shown in FIG. 2A and FIG. 2B. This embodiment of the invention employs two mid-couplings 17 and three funneled tubes 18 as shown. The funneled tubes 18 are connected in a similar manner as described above. However, in this case, the projecting lips 17a of the mid-coupling 17 snaps into place onto both ends 18c and 18d of the additional third funneled tube 18 as shown. Even though the mid-couplings 17 that are "floating" inside will move somewhat they will not execute excessive movement due to at least one end of funneled tube 18 being snapped into each of these mid-couplings 17. Additionally, each of these funneled tubes 18 will be able to expand or contract in any direction within the hollow cylinder 15.

Figure 3:
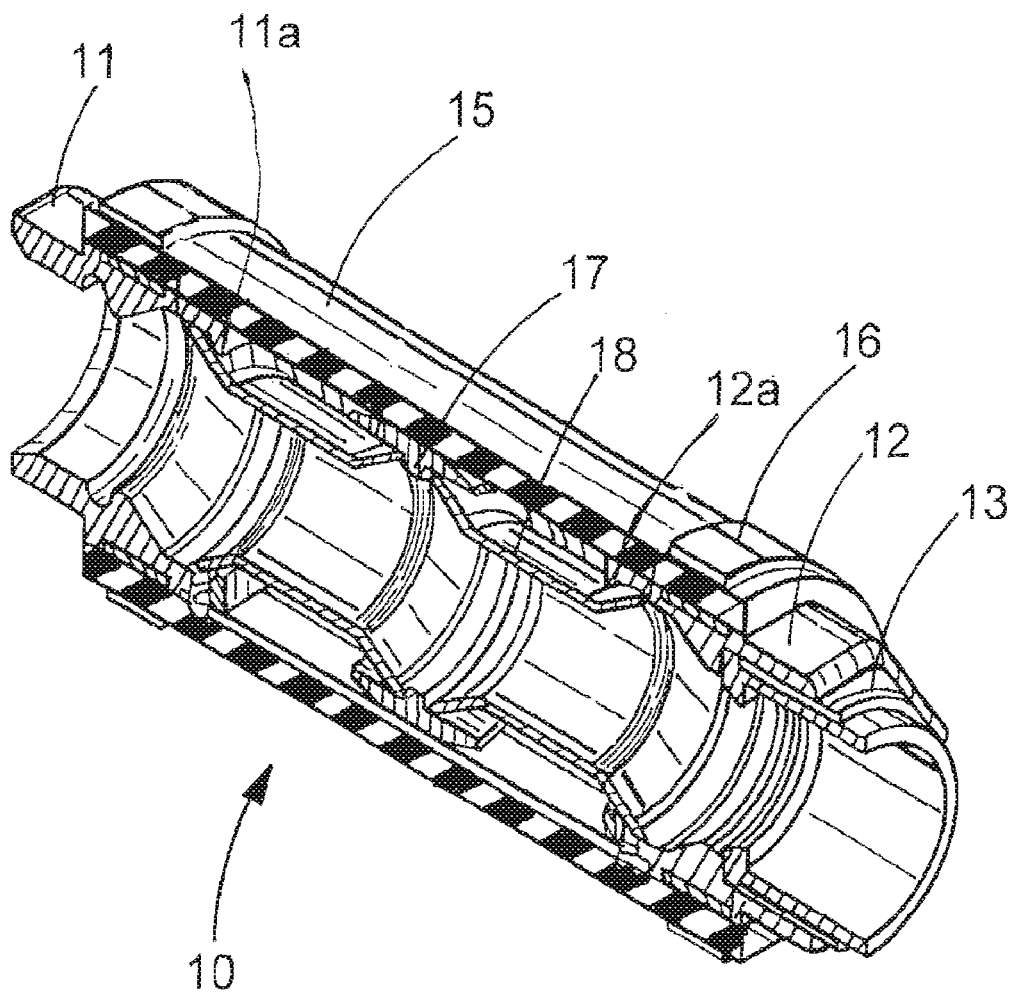
FIG. 3 is a longitudinal partial view of the inside and the outside portion of the coupling according to the present invention.

The coupling assembly of the present invention is much smaller and lighter in design and can be assembled in virtually any length, preferably in 4" increments employing additional mid-couplings 17 and tubes 18. The flexible hollow cylinder 15 can be cut to a desired length with a specific number of funnel tubes 18 and mid-couplings 17 as shown in FIG. 3. As discussed above, each end will have a hub 11 and 12 respectively with the one end of the coupling fitted to accommodate a conduit (not shown).

Figure 4:
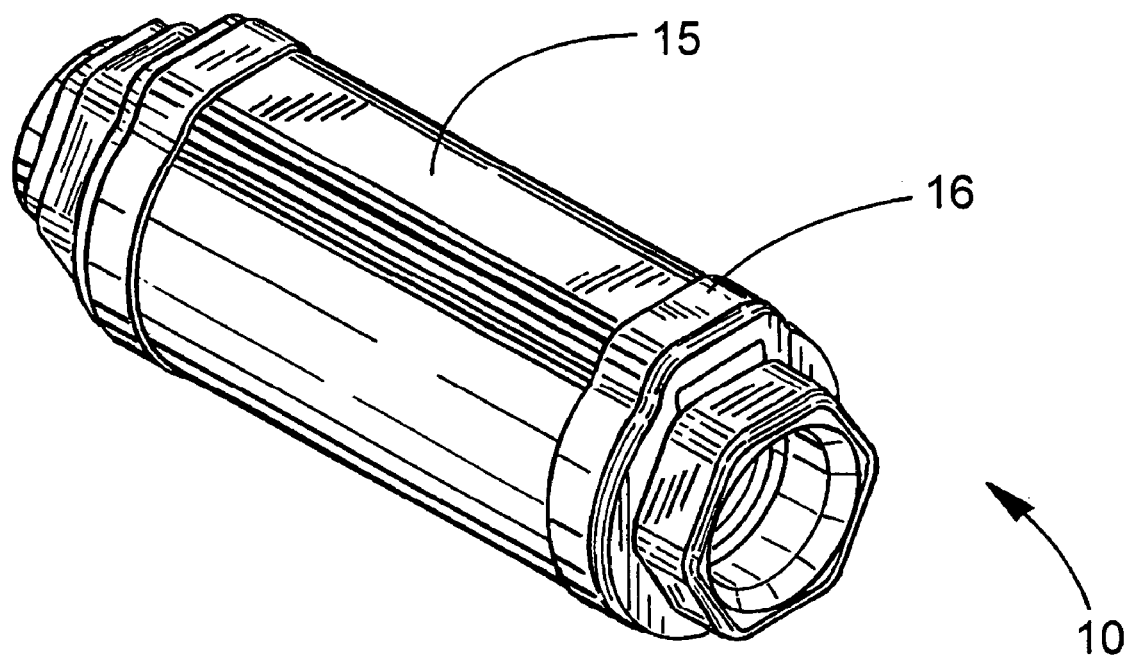
FIG. 4 is a longitudinal view of the outside portion of the coupling according to the present invention.

FIG. 4 show a longitudinal view of the outside portion of the coupling 10 according to the present invention. As discussed above, hollow cylinder 15 is preferably made of rubber. Consequently, due to the flexibility of the hollow cylinder 15, the coupling 10 of the present invention can not only stretch longitudinally, but can flex in any direction. In fact, with the coupling 10 having funneled tubes 18 of up to three or more, as shown in FIG. 2A the coupling can take an "S" shape if so desired due to mid-coupling 17, hub 11 and 12, and funneled tubes 18 operating much like a ball and socket joint.

The expansion-deflection coupling 10 of the present embodiment allows for axial expansion and contraction of up to 1½ to 2 inches and more. Axial expansion or contraction means the axial movement of the hubs is away from or toward each other. The angular misalignment of the axes of coupled conduit runs in any direction up to 45 degrees to 75 degrees and higher, thereby providing a much greater angular displacement of the hubs relative to each other. Additionally, the parallel misalignment of the axes of coupled conduit, i.e., linear misalignment of the hubs runs in any direction up to 1½ to 2 inches. The increase in number of tubes provides for a greater axial expansion and greater angular displacement of the hubs relative to each other.

While the particular embodiments of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An expansion-deflection coupling comprising:
    a pair of hub fittings positioned at opposing ends, wherein one of said pair of hub fittings has an internal diameter adapted to secure to an external diameter of an electrical conduit coupling for attachment thereto;
    a flexible hollow cylinder extending between said hub fittings;
    at least one mid-coupling located within the cylinder, said at least one mid-coupling is a circular band of material having two open circular ends and material therebetween; and
    at least two funneled tubes extending within the flexible hollow cylinder, wherein each of said funneled tubes include two conical ends having an inner conical surface and an outer conical surface parallel thereto and one of said two conical ends is secured within each of said two open circular ends and one conical end is secured to each of said hub fittings, said conical ends and said at least one mid-coupling allow for linear movement therebetween to provide for linear contraction and expansion of said conduit attached thereto;

wherein said hub fittings include inwardly projecting lips and one of said two conical ends is snapped fitted onto one of said lips.

2. The coupling of claim 1 further includes a flexible braid extending between said hub fittings.

3. The coupling of claim 2 wherein said flexible braid is coupled at each end on said hub fittings.

4. The coupling of claim 1 further comprising a union coupling secured to one of said hub fittings to accommodate a conduit within.

5. The coupling of claim 1 wherein said flexible hollow cylinder is made of rubber.

6. The coupling of claim 1 wherein said flexible hollow cylinder is clamped to opposing ends of outer surface of each of the hub fittings.

7. The coupling of claim 1 wherein said flexible hollow cylinder is cut to a desired length so as to accommodate a specific number of said at least one mid-coupling and said funneled tubes.

8. The coupling of claim 1 wherein said at least one mid-coupling floats freely within the cylinder.

9. The coupling of claim 1 wherein each of said funneled tubes further include a central cylindrical tubular configuration having a central interior bore defining a hollow cylindrical aperture.

10. The coupling of claim 1 wherein said at least one mid-coupling includes projecting lips, one of said two conical ends is snapped onto said projecting lips to hold said one of said at least two funneled tubes onto said at least one mid-coupling.

11. An expansion-deflection coupling comprising:
a pair of hub fittings positioned at opposing ends for attachment to conduit;
a flexible hollow cylinder extending between said hub fittings defining a space within;
at least two mid-couplings located within the cylinder, each of said mid-couplings is a circular band of material with two open ends to receive an opposed funneled end therein; and
at least three funneled tubes extending within the flexible hollow cylinder, wherein said each of the funneled tubes include said opposed funneled ends with a cylindrical portion therebetween, said funneled ends include an inner conical surface and an outer conical surface parallel to said inner conical surface, one of the opposed funneled ends movably secured within each of said two open ends of the at least two mid-couplings to allow for linear movement within said at least two mid-couplings and one of said funneled ends movably secured to each of said hub fittings, and each of said at least two funneled tubes is separated from each other by one of said at least two mid-couplings, said opposed funneled ends linearly move within each of said at least two mid-couplings to allow for expansion and contraction of said conduit attached thereto, said hub fittings include projecting lips and said one of the opposed funneled ends of two tubes is snapped fitted onto said lips.

12. The coupling of claim 11 further includes a flexible braid extending between said hub fittings.

13. The coupling of claim 11 further comprising a union coupling secured to one of said hub fittings to accommodate a conduit within.

14. The coupling of claim 11 wherein said flexible hollow cylinder is cut to a desired length so as to accommodate a specific number of said mid-couplings and said funneled tubes.

15. The coupling of claim 11 wherein each of said funneled tubes further include a central cylindrical tubular configuration having a central interior bore defining a hollow cylindrical aperture.

16. The coupling of claim 11 wherein said mid-couplings include projecting lips and said one of the opposed funneled ends of two of said funneled tubes is snapped onto said lips.

17. The coupling of claim 11 further includes clamps attaching each hub fitting to said cylinder, said clamp providing waterproof connection between said cylinder and said hub fittings.

18. The coupling of claim 11 wherein said at least one mid-coupling is made from cast iron.

19. The coupling of claim 11 wherein said at least three funneled tubes are made from steel.

20. An expansion-deflection coupling comprising:
a pair of hub fittings positioned at opposing ends;
a flexible hollow cylinder extending between said hub fittings defining a space within;
a waterproof connection between said cylinder and said hub fittings to prevent water from entering between said cylinder and said pair of hub fittings;
at least one mid-coupling located within the cylinder, said mid-coupling is a circular band; and
at least two funneled tubes extending within the cylinder, each of said funneled tubes includes opposed funneled ends, said funneled ends having an inner conical surface and an outer conical surface parallel to said inner conical surface, at least two of said funneled ends is movably secured to the at least one mid-coupling and one funneled end if movably secured to each of said hub fittings;
wherein said at least one mid-coupling includes projecting lips, one of said two conical ends is snapped onto said projecting lips to hold said one of said at least two funneled tubes onto said at least one mid-coupling.

* * * * *